Oct. 19, 1971  C. E. RICHEY  3,613,222
METHOD FOR MAKING A LIGHTWEIGHT OPTICAL MIRROR
Filed June 23, 1969

INVENTOR.
CHARLES E. RICHEY.
BY E. J. Holler
Charles S. Lynch
ATT'Y.

Oct. 19, 1971 C. E. RICHEY 3,613,222
METHOD FOR MAKING A LIGHTWEIGHT OPTICAL MIRROR
Filed June 23, 1969 5 Sheets-Sheet 4

INVENTOR.
CHARLES E. RICHEY.
BY E. J. Holler
Charles S. Lynch
ATT'Y.

INVENTOR.
CHARLES E. RICHEY.

United States Patent Office 3,613,222
Patented Oct. 19, 1971

3,613,222
METHOD FOR MAKING A LIGHTWEIGHT
OPTICAL MIRROR
Charles E. Richey, Ottawa Lake, Mich., assignor to
Owens-Illinois, Inc.
Filed June 23, 1969, Ser. No. 835,612
Int. Cl. B23p 13/04, 17/00
U.S. Cl. 29—527.1
18 Claims

ABSTRACT OF THE DISCLOSURE

Method and apparatus for lightweighting mirror blanks by first machining a series of accurately positioned bores in the back surface of the blank and then enlarging a portion of these bores into cavities extending a predetermined distance from the back surface to the bore bottom. The enlargement of these cavities is done by an apparatus which reciprocates an air driven tool along the bore walls and also moves the tool around the bore first in a circular path and then in a non-circular path.

---

This invention relates to improvements in method and apparatus for lightweighting mirrors or the like.

Lightweight optical mirrors have always been desirable because they are easier to transport and maneuver particularly when large and of course the supporting structure can likewise be lighter and less complex. With the advent of the outer space craft, this lightweight mirror need is more pronounced, but without comprises in the mirror's structural strength, stability, and precision.

In the past, mirrors have been lightweighted by bonding front and back plates onto a center lightweighted web. Because of the non-unitary construction, temperature changes can produce some unwanted distortions due to the different thermal expansion coefficients of the materials. When the mirrors are made in one piece, conventional casting processes present a problem because necessarily, when lightweighting holes are to be cast in the back surface of the mirror, they must be tapered for core removal purposes. This weakens the back surface. Maximum rigidity is a requirement and the reduced section modulus which will occur from such loss of back plate material may not be tolerable.

With the foregoing in mind, new and different method and apparatus are contemplated for lightweighting a mirror blank by machining a plurality of accurately positioned cavities in the blank while removing a minimum material from the back surface.

Also contemplated by the invention is apparatus that enables bores to be made oversize into cavities which extend inwardly from the surface opening and with a minimum size surface opening.

Also an objective is the provision of apparatus that incorporates a unique device for converting circular motion to non-circular tool motion and that also provides reciprocating tool motion.

A further objective of the invention is the provision of apparatus incorporating a cutting tool which is reciprocated and also rotated around either a circular or a non-circular path and which includes an externally driven cutting tool element.

The foregoing and other objects and advantages of this invention will become apparent from the following description and from the accompanying drawings in which.

Figure 1:
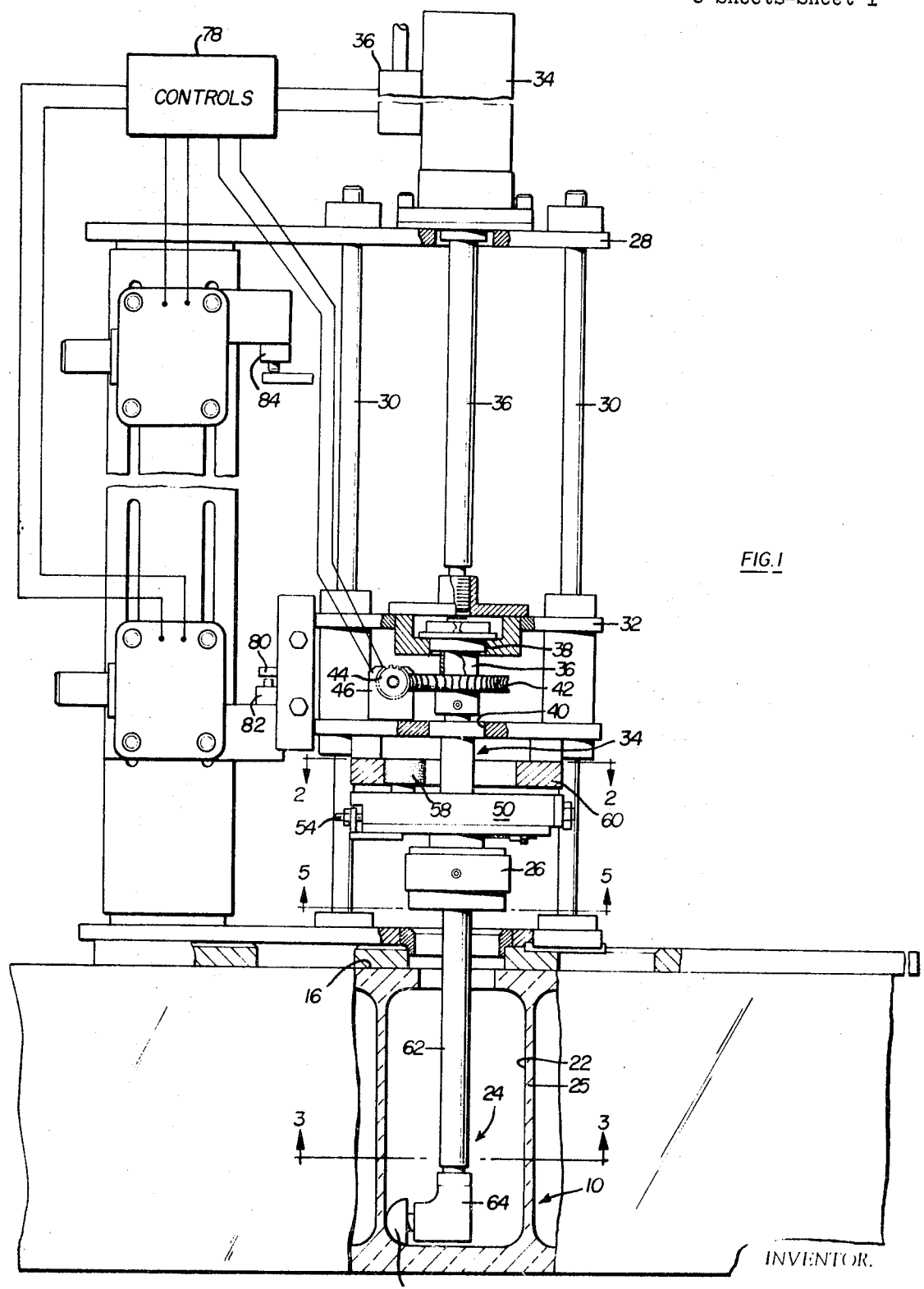
FIG. 1 is a plan view of apparatus partially in section and partially schematic for carrying out the method and also incorporating the principles of the invention.

Referring now to the details of the drawings and first to FIGS. 6 through 11 inclusive, an unfinished mirror blank is designated by the numeral 10. The mirror blank 10 is formed of the material marketed under the trademark Cer-Vit. This material is made by the controlled crystallization of a glass and is referred to as a "glass ceramic" or a "crystallized glass." Of particular significance, is this material's low thermal expansion coefficient, which renders it well suited for mirrors because there is less dimensional change from the temperature variations.

To commence the lightweighting operation, a hollow cutter 12 or what is known as a core drill is used to form a series of accurately positioned bores 14 in a back surface 16 of the mirror blank 10. An appropriate template can be used to lay out the bore location and then a suitable machine tool, such as a radial drill used to drill the individual bores 14 to within a predetermined distance from a front surface 17 of the blank 10.

Figure 6:
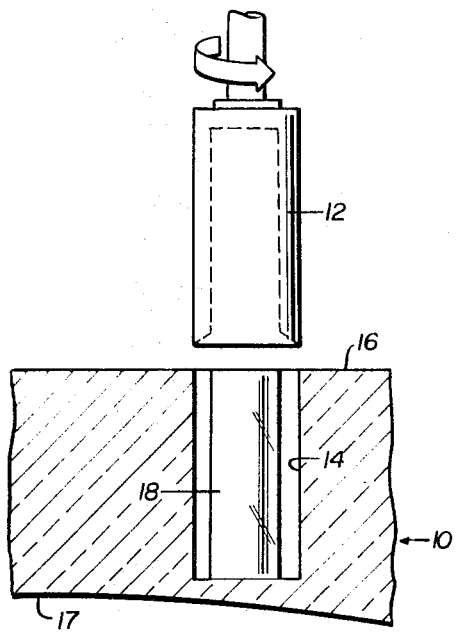
FIGS. 6, 7 and 8 illustrate steps of the method of lightweighting mirror blanks, according to the invention.
Figure 7:
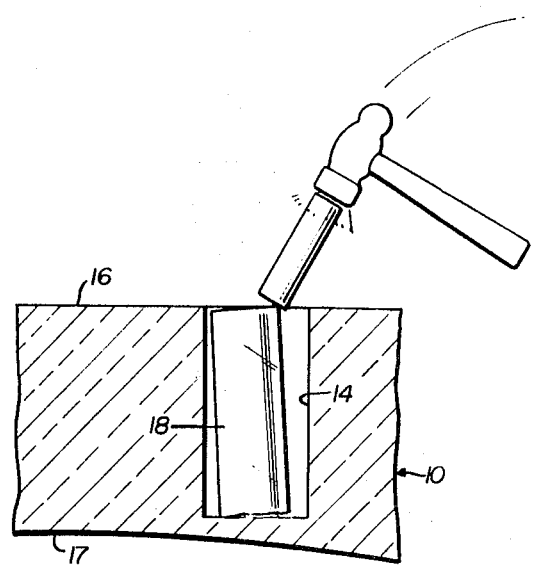

The hollow cutter 12 generates a relatively flat bottom in the bore 14 and leaves a core as is denoted by the numeral 18 in FIGS. 6 and 7. These cores 18 are easily removed by tapping with a hammer or the like as illustrated in FIG. 7. The bore 14 at the back surface 16 is of a minimum diameter but adequate to accommodate the appropriate tools for forming desired cavity configurations.

Figure 8:
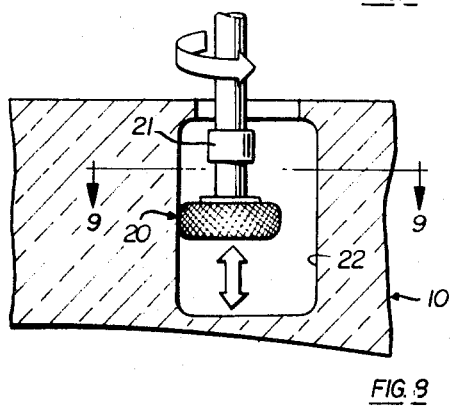
Figure 9:
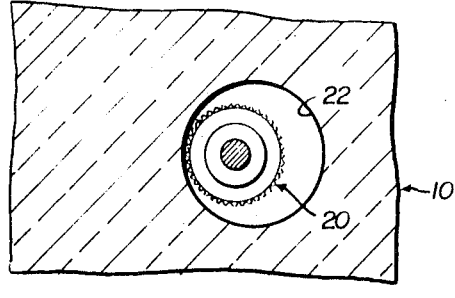
FIG. 9 is a sectional view taken along line 9—9 of FIG. 8 and depicts the relationship between a grinding tool and a previous blank cavity.
Figure 10:
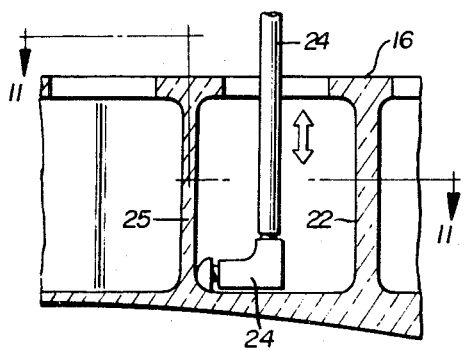
FIG. 10 illustrates another step of the method.

Next illustrated in FIG. 8, a grinding tool 20 is inserted into the bore 14. The grinding tool 20 is preferably driven by an appropriate air motor 21 of a kind to be explained. As those versed in the art will appreciate many other ways are available for driving the cutting tool 20. As viewed in FIG. 9, the axis of the grinding tool 20 is increasingly offset relative to the axis of the bore 14 as the grinding proceeds so as to enlarge the bore 14 into a circular cavity denoted by the numeral 22. The diameter of the cavity 22 in this embodiment is determined by the distance across the flats of the FIG. 11 hexagonal configuration finally to be formed.

After this grinding is completed, another cutting tool 24 is used to achieve the final configuration which is shown as hexagonal, other shapes can be used although the hexagon shape does provide more equal cross sectional areas. This tool 24 is shaped so as to grind the illustrated corner fillets with a rather large radius for structural strength purposes. This insures that stress concentrations do not develop as they would with sharp corners. Also as can be seen in FIG. 13, the back surface has a rather substantial area remaining for the needed structural strength. If wanted, the holes 14 can be plugged by bonding in place inserts or the like to achieve even greater strength. Then too the sidewalls denoted at 25 in FIGS. 10, 11 and 12 have a T-shaped configuration of substantially uniform thickness to achieve further structural strength and less influence which would otherwise be incurred with varying cross sectional areas from temperature changes.

Summarizing the method, a series of accurately positioned bores 14 are drilled in the back surface 16 of the mirror blank 10. Next the cores 18 are removed, and then the bores 14 are each enlarged into a circular cavity 22 extending between the front and back surfaces 16 and 17 of the mirror blank 10. The length of this cavity 22 will be determined by the ultimate use of the lightweighted mirror. Finally this circular configuration is changed to a hexagonal non-circular configuration and a final dimension also by grinding.

Referring now to FIG. 1, the apparatus for generating the cavities 22 has a holder 26 for the cutting tool 24. This holder 26 is positioned on a frame or support 28 so as to impart with reciprocating and rotational movements to the cutting tool 24.

To achieve the reciprocating movements, guideways or guide rods 30 are fixedly positioned to the frame 28 and a carriage 32 is slidably maneuvered on the guide rods 30 by a suitable reversible electric or hydraulic motor 34. For exemplary purposes the motor 34 can be of the piston type, hydraulically operated by an appropriate well-known force motor 36 which directs fluid under pressure from a source (not shown) to either side of the piston while exhausting the other side. This motor 34 is connected by a shaft 36 to the carriage 32.

The rotational movement and its conversion to non-circular movement of the cutting tool 24 is accomplished by a motion conversion device 34, which is supported on and movable with the carriage 32. This device 34 has a drive shaft 36 journaled on the carriage 32 by bearings 38 and 40. Drive connected to this drive shaft 36 is a driven worm wheel 42 which engages a driving worm gear 44. The worm gear 44 is journaled on the carriage 32 and may be rotated manually or by an appropriate electric stepping motor 46. In this embodiment the worm gear 44 is rotated a small angular amount each time the cutting tool 24 is moved to a new machining position as will be described in greater detail.

Figure 4:
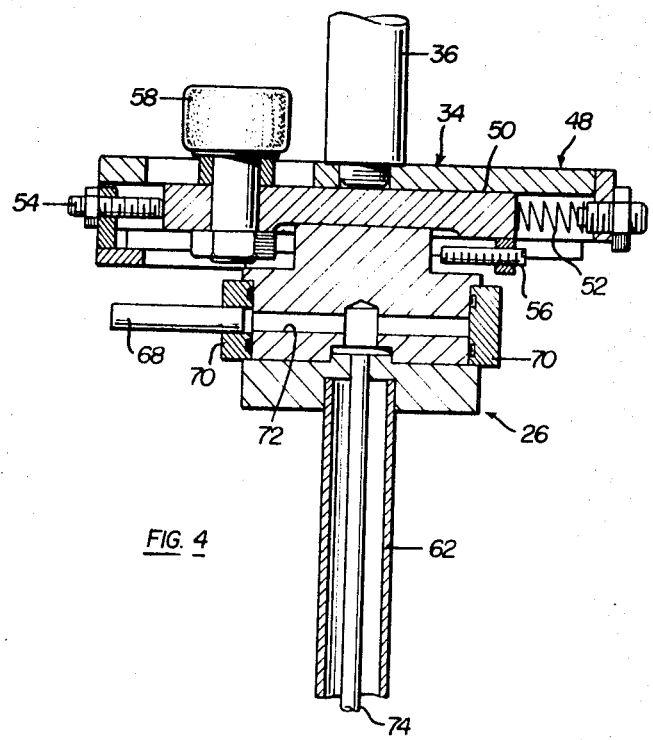
FIG. 4 is a sectional view taken along line 4—4 in FIG. 5 depicting motion conversion device employed in the FIG. 1 apparatus.
Figure 5:
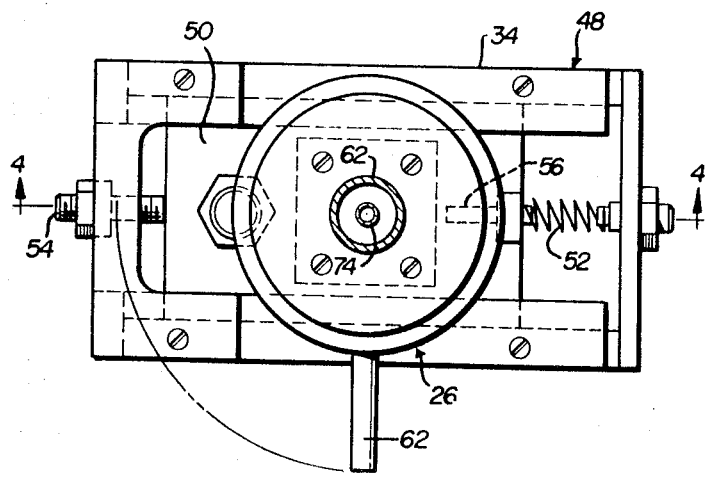
FIG. 5 is a sectional view of the FIG. 1 apparatus taken along line 5—5 in FIG. 1.

The drive shaft 36 at its lower end, as viewed in FIG. 4, is attached to a slide way or bracket 48 in which a slide 50 is movable back and forth in a plane that is substantially perpendicular to its axis of rotation. The slide 50 is appropriately attached by screws or the like, to the holder 26 so that this fore and aft slide movement is also imparted to the cutting tool 24. The slide 50 is urged as viewed in FIG. 4 leftwardly by a bias spring 52 and into an engagement with an adjustable stop screw 54, which determines the extent of offset of the cutting tool 24 relative to the axis of drive shaft 36. Instead of the spring 52, a fluid actuated motor (not shown) of any suitable type can be used. This offset adjustment enables the apparatus to be used to enlarge the bores 14 into the circular cavity 22 displayed in FIGS. 8 and 9. The bracket 48 also has a back stop screw 56 which determines the extent of backward movement of the slide 50, this back stop adjustment permits the slide 50 to be returned to an initial starting position against this stop screw 56 so as to facilitate entrance of the tools 20 and 24 through the opening of the bores 14.

Figure 2:
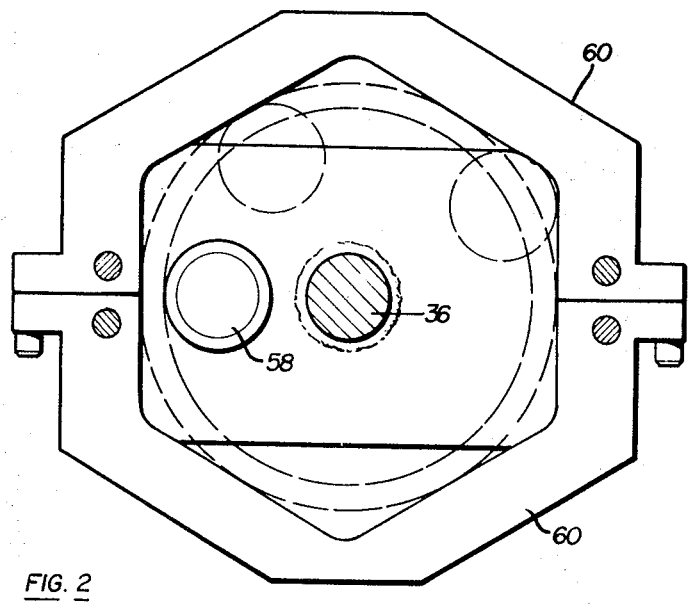
FIG. 2 is a sectional view of the FIG. 1 apparatus taken along line 2—2 in FIG. 1.
Figure 11:
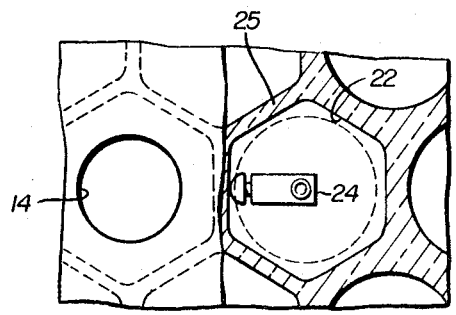
FIG. 11 is a sectional view taken along line 11—11 in FIG. 10 and shows the relationship between a cutting tool and a finished mirror blank cavity.

To impart to the holder 26 and correspondingly to the cutting tool 24, the non-circular motion required to generate the hexagonal shape cavity 22 portrayed in FIG. 11, the slide 50 has attached thereto as viewed in FIG. 4 a cam follower 58. This cam follower 58 is positioned as shown in FIG. 2 within a hexagonal cam 60 affixed to the carriage 32. Therefore the bias spring 52 urges the cam follower 58 against the surface of the cam 60 and when the slide 50 is rotated by the shaft 36 the cam follower 58 will follow the hexagonal shaped path defined by the cam 60 and impart corresponding non-circular movement to the tool 26.

As seen in FIG. 1, the cutting tool 24 used to generate the final hexagonal shape of the cavities 22, has an elongated shaft 62, the upper end of which is suitably secured to the holder 26, e.g., by some kind of a clamping screw (not shown). At the lower end of the elongated shaft 62 is attached an air motor 64 of the kind that has its rotational axis radially extending from the bottom end of elongated shaft 62. An air motor of this kind is made by Dotco Inc., model EX-1221. The air motor 64 drives a cutting or grinding element 66 that has a spherical surface of a configuration that provides the mentioned desired radius for the fillets in the corners of the cavity 22. The air for operating the motor 64, as best seen in FIG. 4, can be supplied from a suitable source (not shown) to a tube 68 secured to manifold ring 70, the ring 70 is seatingly positioned on the holder 26 in alignment with a holder air passage 72. The air passage 72 communicates with a tube 74 extending through the interior of the hollow elongated shaft 62 to the motor 64. The manifold ring 70 and the tube 68 can rotate relative to the holder 26 to facilitate holder rotation and the tube 68 can be attached by a conventional flexible connector to the air source so as to permit the reciprocations of the cutting tool 24.

Relating to the FIG. 1 apparatus and its operation to the aforedescribed method reference is first made to FIG. 8 where as previously explained the cavity 22 of the illustrated circular configuration is shown being formed. To condition the apparatus for this step, the shaft 62 will have attached to the bottom end of the air motor 21 which may be similar to the air motor 64 except that the air motor 21 revolves the grinding tool 20 about an axis that is concentric with the axis of the elongated shaft 62. The air motor 21 is therefore connected to the air source and is operating. Also the carriage 32 is maneuvered so that grinding tool 20 is within the bore 14 and the adjustable stop 54 turned so that the slide 50 will be urged by the bias spring 52 leftwardly and correspondingly the holder 26 thus offsets the axis of the elongated shaft 62 with respect to the axis of the drive shaft 36, an extent reflecting the depth of the cut or grind to be made by the grinding tool 20.

An appropriate control shown at 78 in FIG. 1 can be operated to energize the force motor 36 and cause pressure fluid to be supplied to the motor 34 and commence the feed of the carriage 32, e.g., downwardly. The grinding tool 20 during this downward movement will grind the side of the cavity 22 in the presence of the usual coolant, if required, to the adjusted depth until the grinding tool 20 approaches the bottom of the cavity 22. At the bottom of cavity 22 a stop 80 on the carriage 32 will engage a limit switch 82 positioned on the frame 28 and cause the control 78 to in turn energize the force motor 36 so as to change the pressure application to the motor 34 and retract the carriage 32. At this time the same limit switch 82 can through the control 78 supply the motor 46 with a driving pulse. This driving pulse will cause the driving worm gear 44 to be stepped and therefore through a slight angular amount the driven worm wheel 42, the drive shaft 36 and the slides 50 and 62, advance the cutting tool 20 to the next cutting position. The control 78 will now cause the motor 34 to retract the cutting tool 20 so as to make another machining cut closely adjacent the earlier cut. When the carriage 32 is at the top of its upward stroke, the carriage stop 80 will engage another limit switch 84 and the control 78 will again be caused to reverse the motor 34 and stop the motor.

This cycle of events will continue throughout the entire 360° of the cavity 22 to make a continuous cut to the adjusted depth. Then assuming further material is to be removed the adjusting screw 54 is turned to further increase the depth of cut and the machining repeated for another 360° until the total amount ground from the cavity 22 is approximately equal to distance across the flats of the desired hexagonal configuration.

Figure 3:
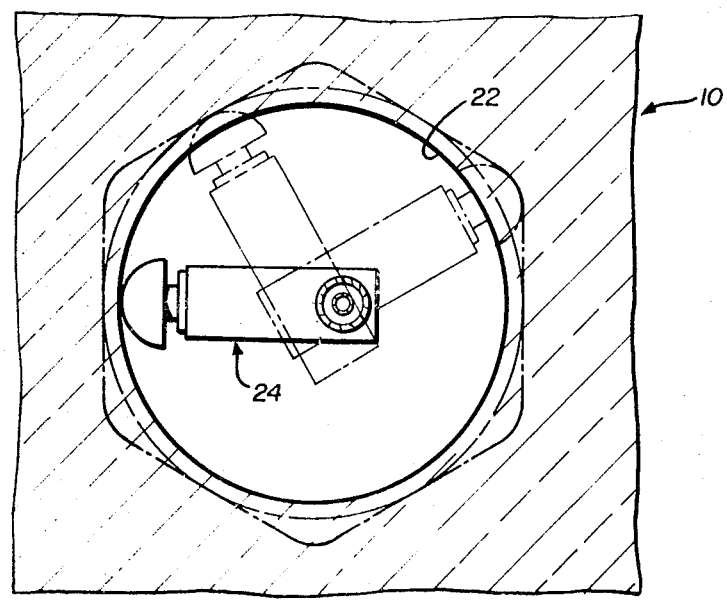
FIG. 3 is a sectional view of the FIG. 1 apparatus taken along line 3—3 in FIG. 1.

When this is done, the grinding wheel 20 is removed and also the air motor 21 and replaced with the air motor 64 and the cutting tool 66. Referring now to FIG. 3 it will be observed that the cutting tool 66 is in one position pursuing a circular path of a diameter less than the distance across the flats of the hexagonal shaped cavity 22. It may be preferred to finish machine from this point to the across flats diameter rather than from the across flats diameter. If so, the operation will be as just described except that the air motor 66 is used. Once, however, the across flats diameter is achieved only the corners of the hexagon remain to be machined. Therefore the adjusting screw 54 is set to the desired depth of cut assuming all of the corner material could not be removed with one cut. The air motor 64 is started and also the motors 34 and 46 to respectively reciprocate and step the cutting tool 24 in the aforementioned way to machine each of the corners. As the machining proceeds and increases in depth, the cam follower 58 will eventually engage the surface of the cam 60. The cam 60 then will replace the adjusting screw 54 as a stop for the slide 50 so that the final hexagonal shape will be machined. Again the usual coolant can be used.

Figure 12:
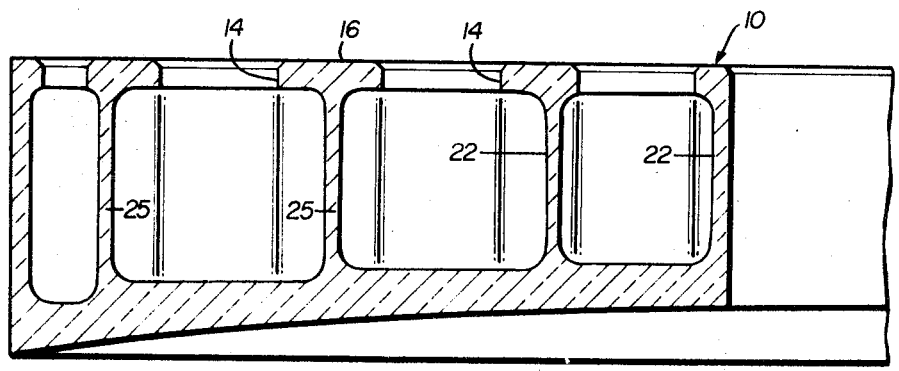
FIG. 12 is a fragmentary sectional view of a finished mirror blank taken along line 12—12 of FIG. 13.
Figure 13:
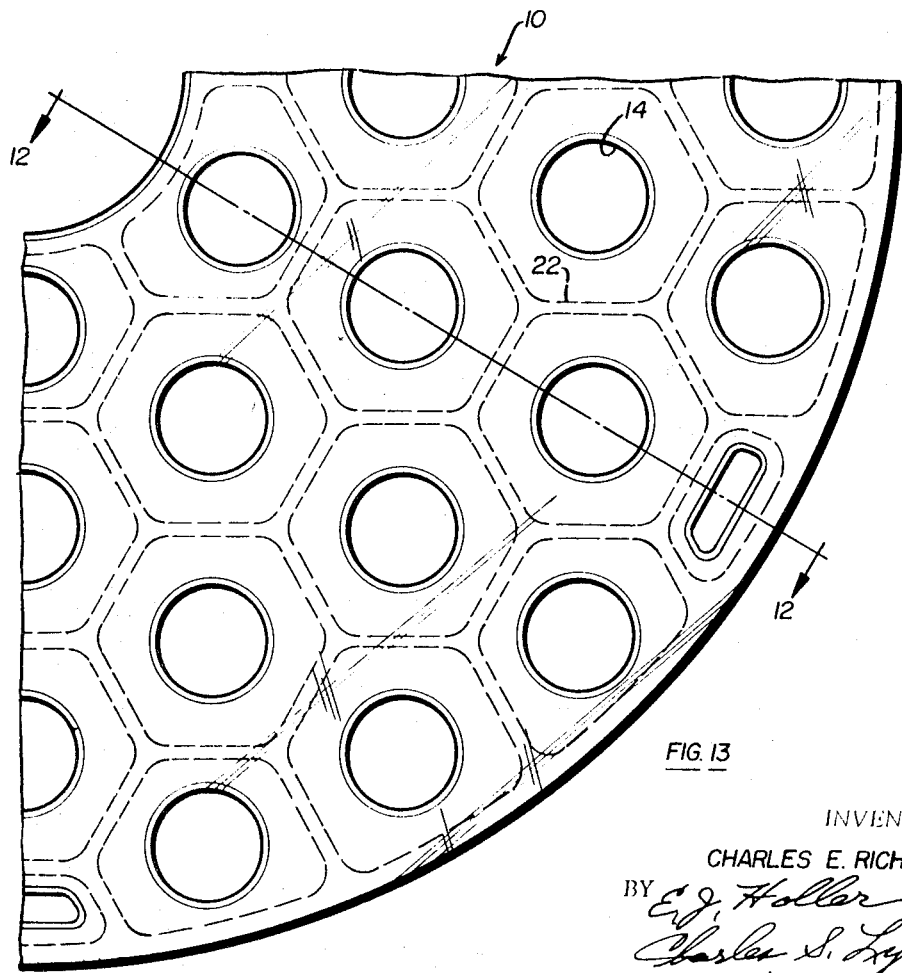
FIG. 13 is a fragmentary plan view partially in section of the mirror blank.

By the foregoing method described and apparatus, each of the hexagonal shaped cavities 22 illustrated in FIGS. 12 and 13, is machined to provide a completed mirror blank 10 with a grid-like honeycomb pattern reduced weight. By way of example and without limitation a 69.% weight reduction was achieved with mirror blank 21.6 cm. thick and having a diameter of approximately 1.5 meters with a 35.6 cm. center hole. This was done with bores of 5.7 cm. diameter which were enlarged to hexagonal cavities with a minor axis of 11.4 cm. and a major axis of 13.2 cm. The webs were 6.4 mm. thick and all fillets had 19 mm. radii. The back and the front of the blank had thicknesses of 19 and 32 mm. respectively.

While the foregoing describes the lightweighting of mirrors, it should be kept in mind that the invention can be used to lightweight other than mirrors.

As can be appreciated with this extent of weight reduction while maintaining relatively constant cross sectional areas renders the mirror blanks particularly suited for ultimate use in space programs. Also, one should be mindful, as has been mentioned, shapes other than the described hexagonal shape can be used as will be readily appreciated by those versed in the art.

What is claimed is:

1. Apparatus for enlarging an undercut bore in an article blank to a predetermined non-circular cross-section comprising a cutting tool holder; means supporting the cutting tool holder for both reciprocating movement and non-circular movement about the axis of reciprocation; the supporting means including a guideway, a carriage slidably mounted on the guideway, and motor means for reciprocating the carriage along the guideway; and motion converting means maneuverable with the carriage for converting circular rotation to noncircular rotation; the motion converting means including a cam surface on the carriage constructed so as to provide a path corresponding to the predetermined non-circular cross section and slide means connected to the cutting tool holder, the slide means being revolvably supported on the carriage and associated with the cam surface so as to be radially shiftable during rotation to follow the cam surface and impart corresponding rotary non-circular rotation to the cutting tool holder and means for rotating the slide means.

2. The apparatus described in claim 1 including a cutting tool having a cutting tool element drive connected to the cutting tool holder and tool driving motor means revolving the cutting tool element.

3. Apparatus for enlarging an undercut bore in an article blank to a predetermined non-circular cross section comprising a cutting tool holder; means supporting the cutting tool holder for both reciprocating movement and non-circular movement about the axis of rotation; the supporting means including a guideway, a carriage slidable on the guideway, and motor means for reciprocating the carriage along the guideway; and motion converting means maneuverable with the carriage for converting circular rotation to non-circular rotation; the motion converting means including a cam surface on the carriage, the cam surface being so constructed as to provide a path corresponding to the non-circular cross-section, a slideway revolvably supported by the carriage, means rotating the slideway, a slide connected to the cutting tool holder and positioned on the slideway for shiftable movement radially of the axis rotation of the slideway, the slide including a cam follower and bias means urging the cam follower into engagement with the cam surface so as to impart non-circular rotation to the cutting tool holder, along a path corresponding to the contour of the cam surface when the slideway is rotated.

4. The apparatus described in claim 3 including cutting tool means carried by the cutting tool holder, the cutting tool means including a rotary cutting tool element, tool driving motor means for revolving the rotary cutting tool element, and elongated shaft connected at one end to the cutting tool holder and at the other end having joined thereto the tool driving motor means.

5. Apparatus described in claim 4 including control means causing the cutting tool to be reciprocated by the motor means and also to be rotated by the slideway rotating means a predetermined angular amount at the end of the reciprocations.

6. The apparatus described in claim 3 wherein the motion converting means further includes stop means on the slideway for adjustably controlling the extent of movement of the slide.

7. The apparatus described in claim 4 wherein the cutting tool element and tool driving motor means are so arranged that the rotary cutting tool element and rotating axis extends radially from the elongated shaft axis.

8. A motion converting device, a support, a slideway revolvably positioned on the support, means rotating the slideway, a slide positioned on the slideway for shiftable movement transversely of the slideway rotational axis, a stop on the slideway for controlling the extent of shiftable movement of the slide, bias means urging the slide against the stop so that the slide will traverse a circular path different from the circular path traversed by the slideway, and stop means on the support operative for further controlling the extent of shiftable movement of the slide so that the slide will traverse a non-circular path when the stop means is operative.

9. The device described in claim 8 wherein the stop means is a cam surface of a predetermined non-circular configuration.

10. In a method of fabricating a lightweight optical mirror or the like, the steps of forming a mirror blank from an initially molten glass ceramic material, said blank having a back surface, forming a plurality of bores extending from the back surface into the blank to predetermine depths along parallel centerlines arranged in a regularly spaced pattern on the back surface, and enlarging a portion of each of the bores without enlarging the opening onto the back surface to form a cavity extending from the bottom of each bore to a predetermined axial distance inwardly from the back surface to form a web in the mirror blank between two adjacent bores having a relatively uniform cross section.

11. The method described in claim 10 including also the steps of forming each of the bores by core drilling the mirror blank to the predetermined depth, and breaking the core free from the mirror blank.

12. The method described in claim 10 including the further step of reshaping the cavities to transform the cross sectional configuration of the cavities portion in a plane normal to the bore axis from a circular configuration to a polygonal configuration such that the portions of the mirror blank remaining between the reshaped bores are in a honeycomb grid-like arrangement of walls of uniform thickness.

13. The method described in claim 10 including the further step of reshaping the cavities to a non-circular configuration and the web has a T-shaped cross section in the plane containing the center lines of the adjacent bores.

14. The method described in claim 13 wherein the non-circular configuration is a hexagon.

15. The method of fabricating a lightweight optical mirror or the like, comprising the steps of forming an initially molten material into a blank, forming a plurality of bores of a relatively small diameter extending into the body of the mirror from the back surface thereof to predetermined depths, the bores being located in a predetermined pattern, inserting into each bore a grinding tool and enlarging a portion of the bore without enlarging the opening of the bore onto the surface, the enlargement extending from a location spaced axially inwardly from the back surface to the bottom of the bore to form the bore into a generally cylindrical cavity opening at one end through the back surface of the mirror body through the concentric passage of the small diameter bore, and grinding the walls of certain of the cylindrical cavities to transform the cross sectional configuration of the cavity from a circular configuration to a polygonal configuration related to the predetermined pattern so that the walls between adjacent cavities are of generally uniform thickness and arranged in a grid-like honeycomb pattern.

16. In a method of making a lightweight glass ceramic mirror or the like, the steps of casting a blank, core drilling a plurality of annular recesses in said blank opening onto one side only thereof, breaking out the resultant core, and enlarging said recesses without enlarging the opening unto said one side, thereby maintaining maximum structural integrity with minimum weight.

17. In a method of making a lightweight optical mirror, the steps of forming an initially molten material into a mirror blank of glass ceramic material, said blank having a back surface, forming a series of recesses in said blank opening onto the back surface thereof and extending into the blank, and enlarging each of said recesses inwardly of the back surface thereof without enlarging the opening of the recesses onto the back surface of the blank.

18. In a method of making a lightweight optical mirror from an initially cast mirror blank having a first surface to be later optically finished and a back surface spaced from the front surface, the steps of forming a plurality of spaced recesses of circular cross-section in said blank, said recesses opening onto the back surface and terminating interiorly of said blank short of said front surface, and enlarging each of said recesses interiorly of said blank to a polygonal cross-section without enlarging the openings of said recesses onto said back surface.

References Cited

UNITED STATES PATENTS

| 1,614,558 | 1/1927 | Kasley. |
| 3,453,041 | 7/1969 | Rantsch _ _ _ _ _ _ _ _ _ _ _ _ 350—310 |

FOREIGN PATENTS 1,126,930  9/1968  Great Britain.

JOHN F. CAMPBELL, Primary Examiner

D. C. REILEY, Assistant Examiner

U.S. Cl. X.R.

29—557, 558; 51—284; 350—320

PO-1050
(5/69)

UNITED STATES PATENT OFFICE
CERTIFICATE OF CORRECTION

Patent No. 3,613,222          Dated October 19, 1971

Inventor(s) C. E. RICHEY

It is certified that error appears in the above-identified patent and that said Letters Patent are hereby corrected as shown below:

column 6, line 57, after "molten" delete --glass ceramic--.

Signed and sealed this 18th day of April 1972.

(SEAL)
Attest:

EDWARD M. FLETCHER, JR.          ROBERT GOTTSCHALK
Attesting Officer          Commissioner of Patents